United States Patent
Thomson et al.

(10) Patent No.: US 9,414,211 B2
(45) Date of Patent: Aug. 9, 2016

(54) PERFORMANCE CENTER MOBILE SUPERVISOR APPLICATION

(75) Inventors: Rodney A. Thomson, Westminster, CO (US); Brian J. Reynolds, Erie, CO (US); Jeff Chu, Arvada, CO (US); Onkar Birk, Superior, CO (US); Barrett Davis, Erie, CO (US)

(73) Assignee: Avaya Inc., Basking Ridge, NJ (US)

( * ) Notice: Subject to any disclaimer, the term of this patent is extended or adjusted under 35 U.S.C. 154(b) by 199 days.

(21) Appl. No.: 13/348,412

(22) Filed: Jan. 11, 2012

(65) Prior Publication Data

US 2012/0295594 A1    Nov. 22, 2012

Related U.S. Application Data

(60) Provisional application No. 61/488,604, filed on May 20, 2011.

(51) Int. Cl.
| | | |
|---|---|---|
| G06F 15/16 | (2006.01) | |
| H04W 4/16 | (2009.01) | |
| H04M 3/523 | (2006.01) | |
| H04M 3/51 | (2006.01) | |

(52) U.S. Cl.
CPC .............. *H04W 4/16* (2013.01); *H04M 3/5175* (2013.01); *H04M 3/523* (2013.01); *H04M 3/5233* (2013.01)

(58) Field of Classification Search
CPC ......... H04L 65/80; H04W 4/16; H04M 3/523
USPC .......................... 709/206; 379/265.02, 265.03
See application file for complete search history.

(56) References Cited

U.S. PATENT DOCUMENTS

| | | | | |
|---|---|---|---|---|
| 5,884,032 | A | * | 3/1999 | Bateman et al. ............... 709/204 |
| 5,999,965 | A | * | 12/1999 | Kelly ............................. 709/202 |
| 6,128,380 | A | * | 10/2000 | Shaffer et al. ............ 379/265.01 |
| 7,558,739 | B2 | | 7/2009 | Thomson |
| 7,936,867 | B1 | | 5/2011 | Hill et al. |
| 8,000,989 | B1 | | 8/2011 | Kiefhaber et al. |
| 2006/0002540 | A1 | * | 1/2006 | Kreiner et al. ........... 379/265.02 |
| 2006/0109975 | A1 | * | 5/2006 | Judkins et al. ........... 379/265.02 |
| 2006/0152577 | A1 | * | 7/2006 | Hagendorf et al. ........ 348/14.01 |
| 2007/0064913 | A1 | * | 3/2007 | Shaffer et al. ............. 379/265.02 |
| 2007/0130599 | A1 | * | 6/2007 | Monroe ........................ 725/105 |

OTHER PUBLICATIONS

Cisco, "Cisco Mobile Supervisor", available at http://itunes.apple.com/us/app/cisco-mobile-supervisor/id307029082?mt=8, iTunes Apple Online Store, Apple Inc., 2011, 3 pages.

Angel, "Angel Mobile for iPhone, iPad and Android Smart Devices", available at www.angel.com/products/angel-mobile.php, Angel, 2011, 1 page.

(Continued)

*Primary Examiner* — Yves Dalencourt
(74) *Attorney, Agent, or Firm* — Sheridan Ross P.C.

(57) ABSTRACT

Methods and systems for supporting the remote monitoring and control of automatic call distribution systems are provided. In particular, an application for execution on a mobile device is provided. The application presents ACD system status information to a supervisor of the ACD system. The application additionally accepts control input from the supervisor, and can pass that control input to the ACD system server for action.

20 Claims, 8 Drawing Sheets

(56) References Cited

OTHER PUBLICATIONS

McDonald, John, "New software applications extend the call center to mobile employees", available at http://www.emqus.com/index.php?/emq/article/new_software_applications_extend_the_call_center_to_mobile_employees_442, EMQ Enterprise Management Quarterly, Boston Hannah International, 2008-2012, 2 pages.

Accanto Systems, "Applications—Mobile Network Monitoring—SS7 Monitoring", available at http://www.angel.com/products/angel-mobile.php, Accanto Systems, 2012, 1 page.

* cited by examiner

PERFORMANCE CENTER MOBILE SUPERVISOR APPLICATION

CROSS-REFERENCE TO RELATED APPLICATIONS

This application claims the benefit of U.S. Provisional Patent Application Ser. No. 61/488,604, filed May 20, 2011, the entire disclosure of which is hereby incorporated herein by reference.

FIELD

The present invention is directed to providing a mobile application for use in connection with monitoring and controlling a contact center.

BACKGROUND

Call center agents are used to provide customer service and support. Commonly, call center agents are assigned to particular queues within the call center. Each queue is adapted to provide particular types of services. For example, different queues can be defined for performing or facilitating different types of transactions with customers.

Contact center operation is typically monitored by one or more supervisors. Due in part to the automated control and monitoring features provided by many contact centers, supervisors become tethered to their desks in order to monitor the contact center. Alternatively, supervisors are dependent on a wall board showing contact center status and/or configuration information. However, a wall board does not allow a supervisor to take corrective action if a problem has or is seen as developing in the contact center. In order to obtain more frequent and/or timely information then is provided by a wall board, some supervisors carry laptops so they can monitor the contact center health and take corrective action if necessary. As another alternative, some supervisors use cell phones to get email, which leaves them reliant on someone or some system to generate an email to notify them if there is a problem. Moreover, upon receiving an email, the supervisor must return to their desk in order to obtain current status information, and in order to take any corrective action. Time is of the essence in a contact center, therefore delays in taking action can result in a contact center not meeting its business objectives, such as maintaining certain minimum service levels.

SUMMARY

Systems and methods that provide a mobile application for monitoring and controlling operation of a call or contact center are disclosed herein. More particularly, an application for execution by a device having a wireless connection to a server is provided. The application enables monitoring of a wide array of contact center parameters, and also allows a supervisor to make changes with respect to the contact center.

In accordance with embodiments of the present disclosure, the application provides a template for the display of contact center status information, and to receive input from the supervisor using the application to control aspects of the operation of the contact center. The data concerning the configuration of the contact center can be loaded onto the device for use by the application to initialize the application. From that point, operation proceeds with data being fed to the application on the mobile device. More particularly, data that changes slowly ("slow data") can be updated periodically. Data that can change quickly ("fast data") can be pushed to the application on the mobile device when changes occur.

Information that is relatively static, such as agent information, can be pre-populated in the application on the mobile device. Accordingly, such information does not need to be sent as part of a live data feed. If a live data feed is lost, a timer associated with the application on the mobile device continues to run. Moreover, the information displayed is updated once the data feed is restored.

The application on the mobile device is also capable of facilitating control of the contact center by the supervisor via the application on the mobile device. In particular, the supervisor can perform various commands, such as changing agent assignments, reconfiguring skill levels associated with queues, and changing other agent and/or queue parameters. When a command input is received from a supervisor, the application on the mobile device pushes the command to the contact center server, which can then take action in response to the command.

In accordance with at least some embodiments, a system as described herein can include an application executed by a mobile device, such as a tablet computer, laptop, or smart phone. Moreover, the mobile device is capable of wireless communication, to allow the mobile device to remain untethered while in communication with the contact center server. Data populating the application on the mobile device can be loaded onto the mobile device in different ways. For example, data that rarely changes and/or is relatively voluminous can be pre-populated in the application on the mobile device. That is, such data can be loaded onto the mobile device before the device is actively being used to monitor and control the contact center. Other data, which may change relatively slowly and/or is not as important to receive immediately upon a change can be pulled to the mobile device periodically by the application on the mobile device. Accordingly, the mobile device can implement a timer function. Alternatively or in addition, the same or different classes of slow data can be pushed to the application on the mobile device by the contact center server. Still other data, for example data that changes frequently and/or must be brought to the attention of the supervisor without undo delay, can be pushed to the application on the mobile device as such data is changed and/or received by the contact center server.

The application can pass commands entered by the supervisor to the contact center server for action. In addition, the application on the remote device can support email, instant messaging, or other communications with individual agents or groups of agents. Additional features and advantages of embodiments of the present invention will become more readily apparent from the following description, particularly when taken together with the accompanying drawings.

DETAILED DESCRIPTION

Figure 1:
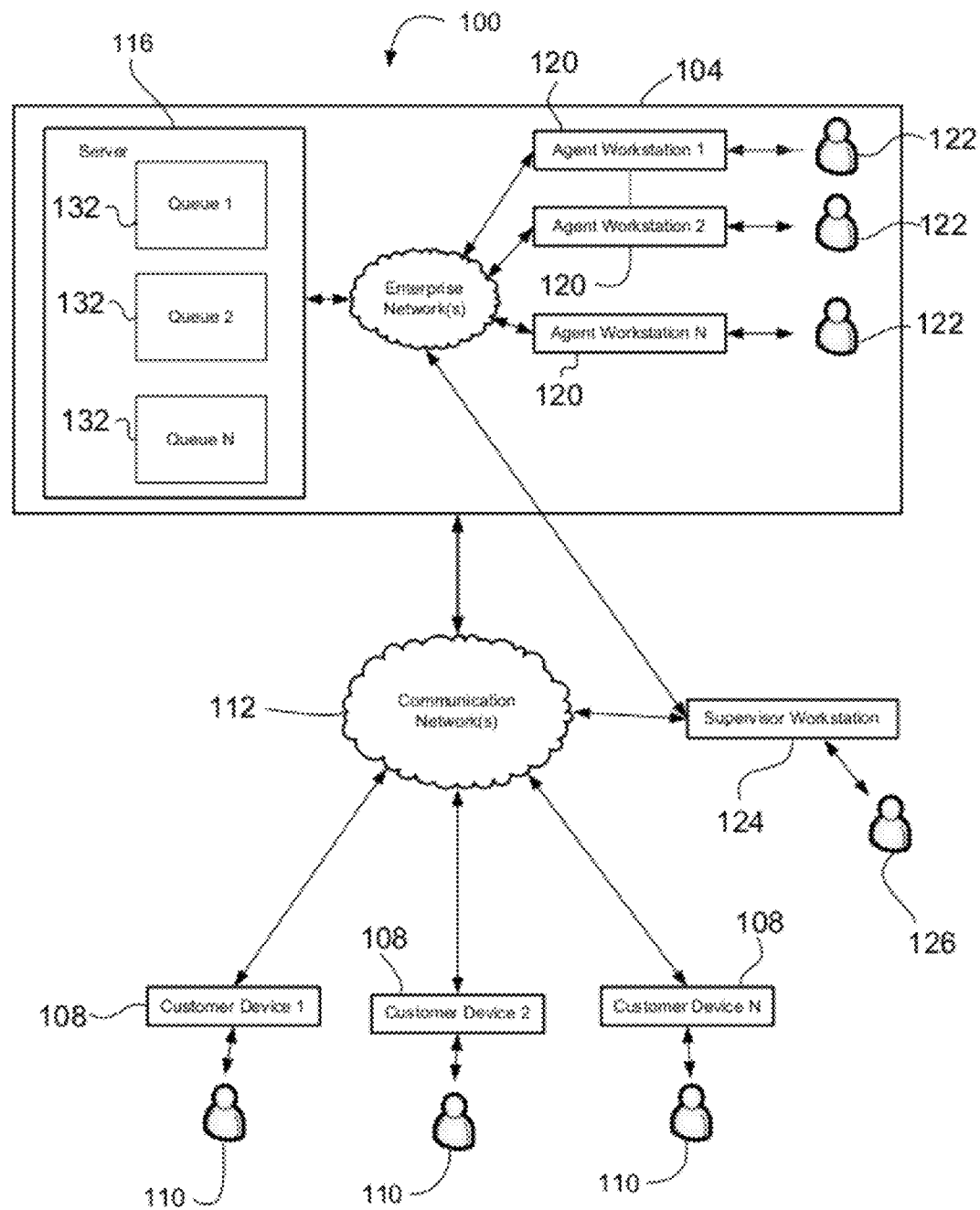
FIG. 1 is a block diagram depicting components of a system in accordance with embodiments of the present invention.

FIG. 1 is a block diagram depicting components of a communication system 100 in accordance with embodiments of the present invention. In particular, the communication system 100 includes a call or contact center 104. In general, the call center 104 can be in communication with one or more customer endpoints or devices 108 via one or more communication networks 112. Examples of customer endpoints 108 include but are not limited to, telephones, cellular telephones, and desktop or mobile computing devices, or any other device capable of supporting communications between a customer and a customer service or other agent associated with the contact center. Moreover, the communications between the call center 104 and the customer endpoints 108 can comprise voice telephony, video telephony, email, instant messaging, short message system, or other real time or non-real time communications. The communication network 112 can include the Internet, local area network, wide area network, public switched telephony network (PSTN), wireless networks, or a plurality of networks in any combination. The contact center 104 generally includes a call center server 116, such as an automatic contact (or call) distribution system (ACD) server 116. The ACD server 116 is illustratively the MultiVantage™ enterprise communication-based ACD system available from Avaya Inc. The ACD server 116 is interconnected to a plurality of agent workstations or endpoints 120. The agent workstations 120 may be connected to the ACD server 116 by a voice and/or data transmission median or enterprise network 128.

The ACD server 116 generally functions to connect agent workstations 120 to customer devices or endpoints 108 through the communication network 112, to place customers 110 in communication with agents 122. In addition, the ACD server 116 maintains queues 132 for servicing customer contacts. The different queues 132 can be used to sort contacts from (or to) customer endpoints 108 by type, identity of the customer or contact 110, or any other attribute. Agents 122 associated with the agent workstations 120 are assigned to provide services to contacts that have been placed within one or more of the queues 132 based on availability and/or weighting factors.

In addition, embodiments of a communication system 100 include a supervisor or administrator mobile device 124. The supervisor mobile device 124 is in communication with the ACD server 116 via the communication network 112 and/or the enterprise network 128. For example, while the supervisor mobile device 124 is on the premises of the contact center 104, communications with the ACD server 116 may be over a portion of the enterprise network 128 comprising a wireless (e.g., a Wi-Fi) network. As another example, the supervisor mobile device 124 may be in communication with the ACD server 116 over the communication network 112, and in particular via a cellular telephony data network or a Wi-Fi connection outside of the enterprise network 128 and the public Internet. In general, the supervisor mobile device 124 provides functionality that allows a supervisor 126 to monitor the health of the contact center 104, and to control aspects of the operation of the contact center 104.

The supervisor mobile device 124 can comprise any mobile device capable of presenting information to a supervisor 126, and of receiving control commands from the supervisor 126. In addition, the supervisor mobile device 124 is generally a device capable of running an application that provides a template or framework for displaying information and receiving input with respect to such information. In addition, the supervisor mobile device 124 is a device that is capable of wireless communications over at least one of a variety of wireless network types, including but not limited to cellular data networks (such as 3G or 4G networks), Wi-Fi networks, WiMax networks, Bluetooth connections, and the like. Accordingly, a supervisor mobile device 124 can include, but is not limited to, a tablet computer, a laptop computer, a Smartphone, a Netbook, or the like.

Figure 2A:
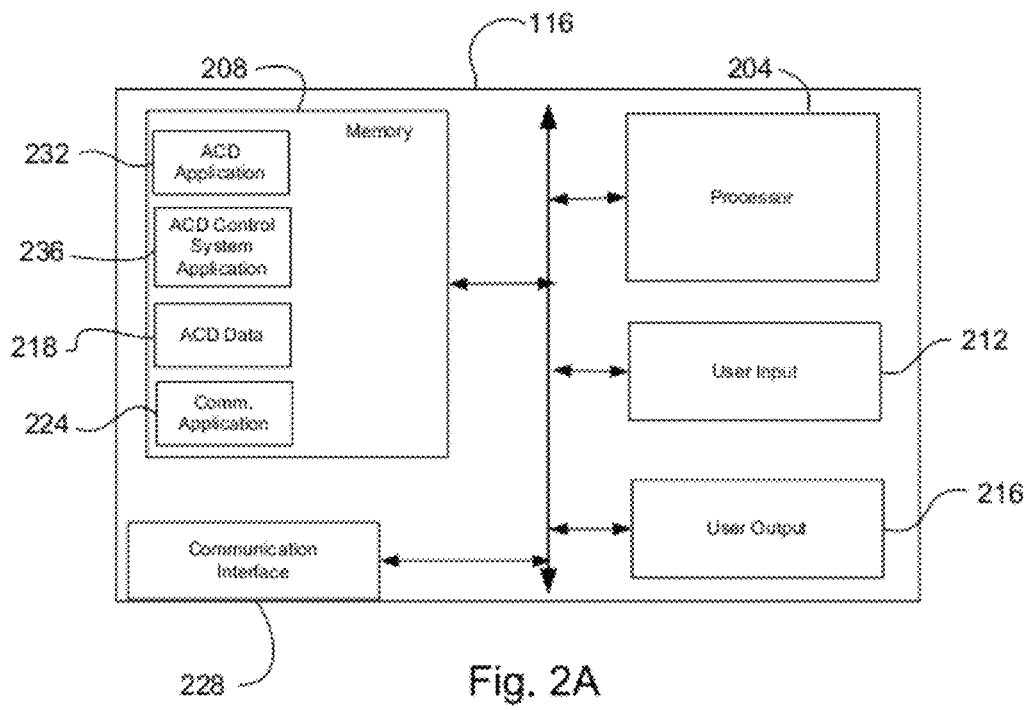
FIGS. 2A-2B are block diagrams of a contact center server and a mobile device running a mobile supervisor application respectively in accordance with embodiments of the present invention.
Figure 2B:
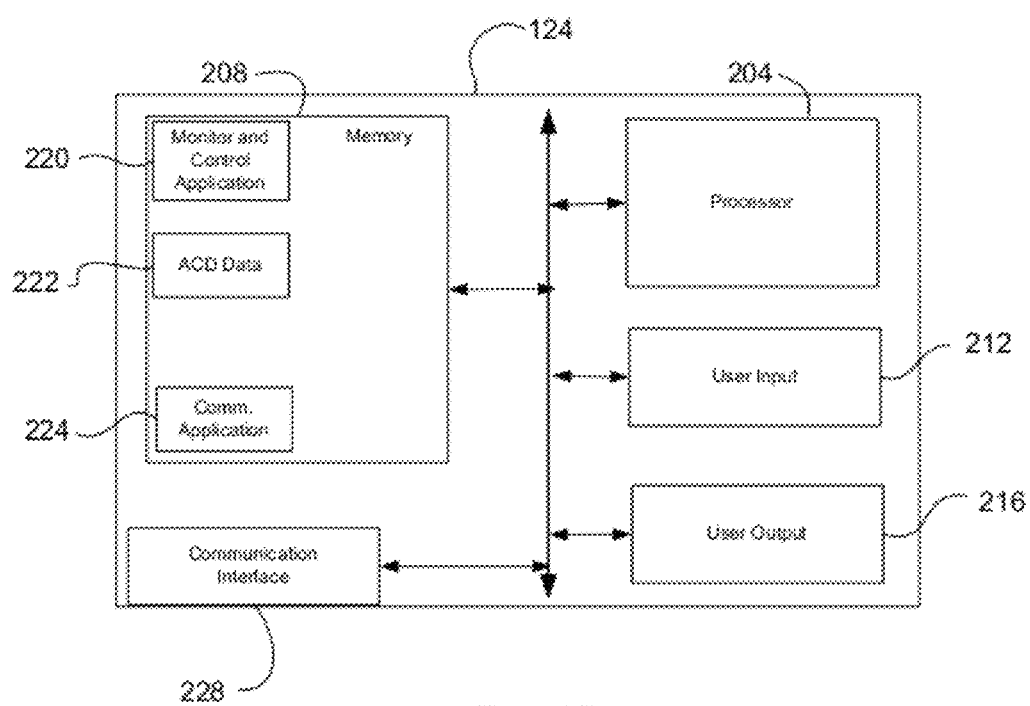

FIGS. 2A-2B are block diagrams depicting components of an ACD system 104 in accordance with embodiments of the present invention. More particularly, components of an ACD server 116 are shown in FIG. 2A, while components of a supervisor mobile device 124 are shown in FIG. 2B.

As the ACD server 116 and the supervisor mobile device 124 can, at least partially, be implemented as conventional computing devices, they share certain components in common. For example, each generally includes a processor 204 capable of executing program instructions. The processor 204 may include any general purpose programmable processor or controller for executing application programming. Alternatively, the processor 204 may comprise a specially configured application specific integrated circuit (ASIC). The processor 204 generally functions to run programming code implementing various functions performed by the associated ACD server 116 or supervisor mobile device 124. For example, with respect to the ACD server 116 (see FIG. 2A), the processor 204 can implement functions including assigning incoming contacts received by the contact center 104 from customer endpoints 108 to contact queues 132 and to agent workstations 120 for handling by associated agents 122. As another example, with respect to the supervisor mobile device 126 (see FIG. 2B), such functions may include displaying information regarding the operation of the call center 104 to the supervisor 126, and to receiving commands input by the supervisor 126 with respect to the operation of the contact center. Moreover, as described in greater detail elsewhere herein, the ACD server 116 and the supervisor mobile device 124 operate in cooperation with one another to provide monitoring and control functions to a supervisor 126, to assist in the operation of the contact center 104.

The ACD server 116 and the supervisor mobile device 124 additionally include memory 208. The memory 208 can be used in connection with the execution of programming by the processor 204 of the associated device 116 or 124, and for the temporary or long term storage of data or program instructions. For example, the ACD server 116, as shown in FIG. 2A, can include an automatic call distribution application 232 that is stored in memory 208. As an additional example, the ACD server 116 can operate in connection with the operation of an ACD control system application 236 stored in the memory 208 that operates as an adjunct to or in cooperation with the ACD application 212. The memory 208 of the ACD server 116 can also function as a store for records or other data 218 that related to the ACD or contact queues 132 maintained by the ACD server 116. The memory 208 included in the supervisor mobile device 124, as shown in FIG. 2B, can include a monitor and control application 220. As described in greater detail elsewhere herein, the monitor and control application 220 can provide a user interface to display information regarding the operation of the ACD system 104 to the supervisor 126, and to receive control input from the supervisor 126. The memory 208 in the supervisor mobile device 124 can also provide storage for ACD system 104 data 222. The memory 208 of the ACD server 116 and/or the supervisor mobile device 124 can additionally provide storage for one or more communication applications 224. Examples of communication applications 224 include, but are not limited to, email, instant messaging, voice telephony, video telephony, and the like. The memory 208 of the ACD server 116 and/or the supervisor mobile device 124 can include solid state memory that is resident, removable and/or remote in nature, such as DRAM and SDRAM. Alternatively or in addition, the memory 208 can include magnetic, optical or other storage devices. Moreover, the memory can include a plurality of discrete components of different types and/or a plurality of logical partitions.

In addition, user input devices 212 and user output devices 216 may be provided. With respect to the ACD server 116, such devices 212 and 216 can be used in connection with the monitoring and control of the ACD system 104 by a supervisor 126 or an administrator in a conventional fashion, in which the supervisor 126 or administrator is tethered to the ACD system 104. With respect to the supervisor mobile device 124, the one or more user input devices 212 or one or more user output devices 216 facilitate the remote monitoring and control of the ACD system 104 by the supervisor 126. Examples of user input devices 212 include a keyboard, a numeric keypad, touch screen, microphone, scanner, and pointing device combined with a screen or other position encoder. Examples of user output devices 216 include a display, a speaker, and a printer. The ACD server 116 and the supervisor mobile device 124 also generally include a communication interface 228 to interconnect the server 116 or device 126 to the networks 112 and 128.

FIGS. 3A-3D depict different exemplary pages or screens that can be presented to a supervisor 126 by a user interface 304, through execution of the monitor and control application 220 on the supervisor mobile device 124. For example, the monitor and control application 220 may include different templates or frameworks for presenting the different screens or collection of information.

Figure 3A:
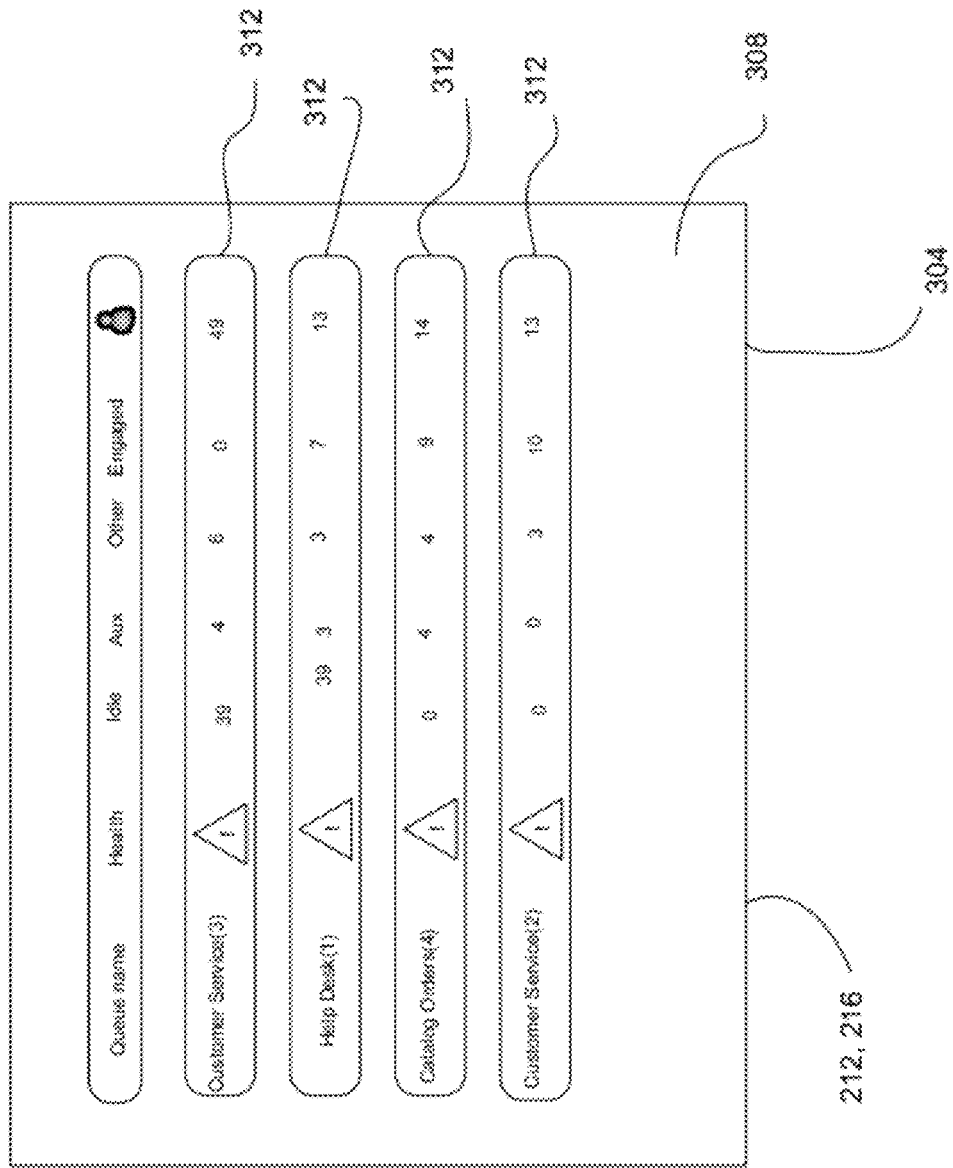
FIGS. 3A-3D depict a user interface presented by a mobile device running a mobile supervisor application in accordance with embodiments of the present invention.

More particularly, FIG. 3A depicts the user interface 304, and in particular a queue status display screen 308, with lines of data 312 that each display health information concerning a different queue 132 of the ACD system 104. As described in greater detail elsewhere herein, the information or data displayed by the user interface 304 can be of different types. Information that is particular to the ACD system 104 being monitored and that is relatively static (i.e., it changes slowly and/or infrequently) can be pre-provisioned on the supervisor mobile device 124, for example before the supervisor mobile device 124 is activated for real time monitoring of the ACD system 104. Examples of such data include agents 122 that are employees or otherwise available to the ACD system 104 and profile information regarding those agents 122. Data that changes more frequently and/or is more time sensitive can be pushed to or pulled by the supervisor mobile device 124 for presentation by the user interface 304. For example, changes to the health of a queue 132 can be pushed by the ACD server 116 to the supervisor mobile device 124 when or following changes to such data on the ACD server 116. An example of data being pulled from the ACD server 116 to the supervisor mobile device 124 can include a request for data periodically, or a request for data entered manually by the supervisor 126.

Figure 3B:
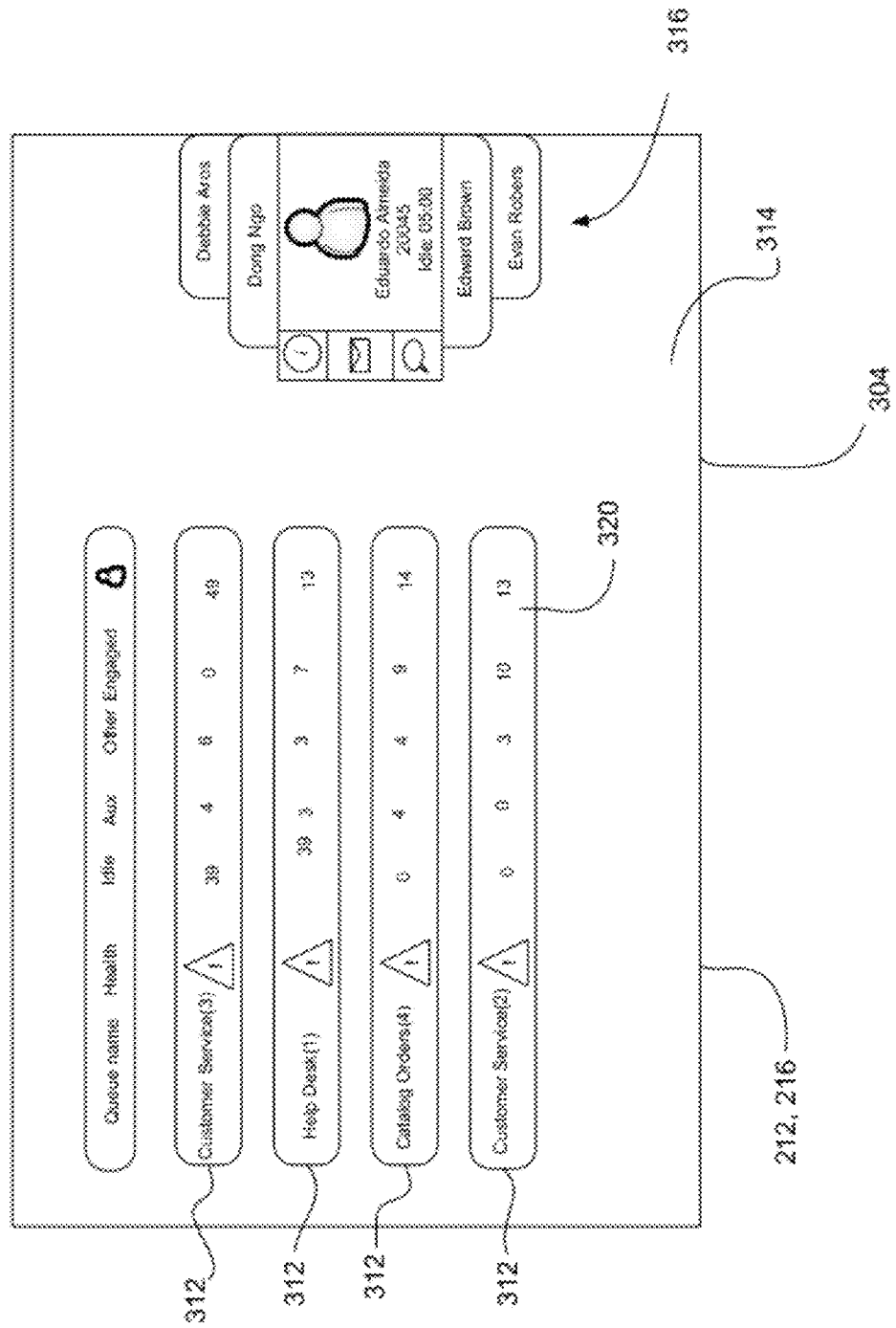

FIG. 3B depicts the user interface 304 display screen 314 presenting ACD system 104 agent 122 information 316, in addition to the status information 312 regarding individual queues 132. In particular, this screen 314 allows the supervisor 126 to enter control information by manipulating objects displayed by the touch screen combined input/output device 212, 216 of the supervisor mobile device 124. For example, by selecting a listed agent, the supervisor 126 can access detailed information about that agent, including biographical information. This information can include agent qualifications and a photograph of each of the agents. Moreover, groups of agents can be selected. For example, by touching the agent icon 320 provided as part of a line of data 312 for a queue 132, the supervisor 126 can access information about the agents 122 currently assigned to the queue 132.

Figure 3C:
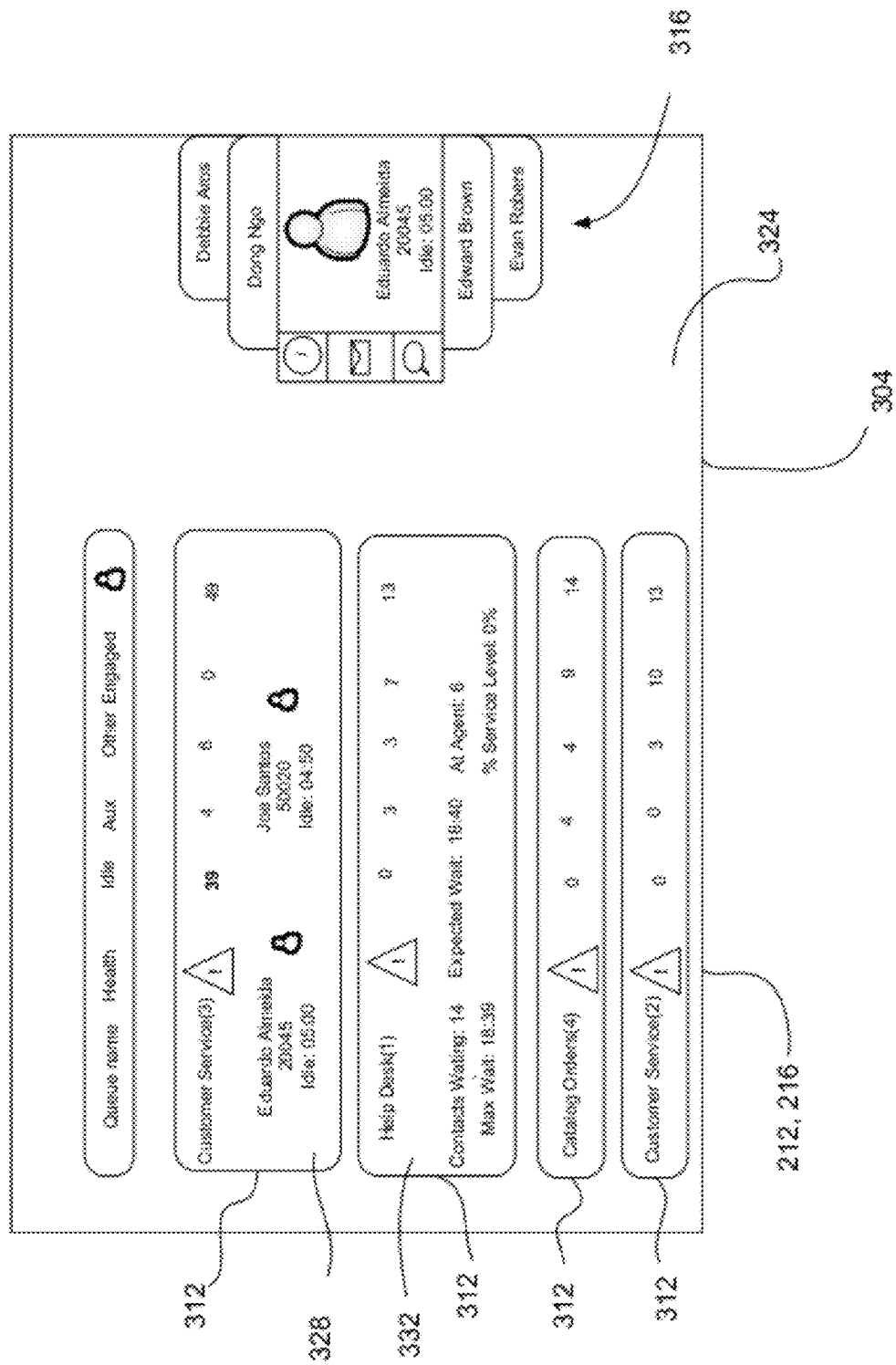

FIG. 3C depicts a screen 324 in which the supervisor 126 has drilled into queue details. In this example the queue details that have been selected for viewing include information about agents 122 in an idle state 328 associated with the first selected queue 132. The queue details displayed with respect to the other selected queue 132 include information 332 regarding the health 332 of the selected queue 132.

Figure 3D:
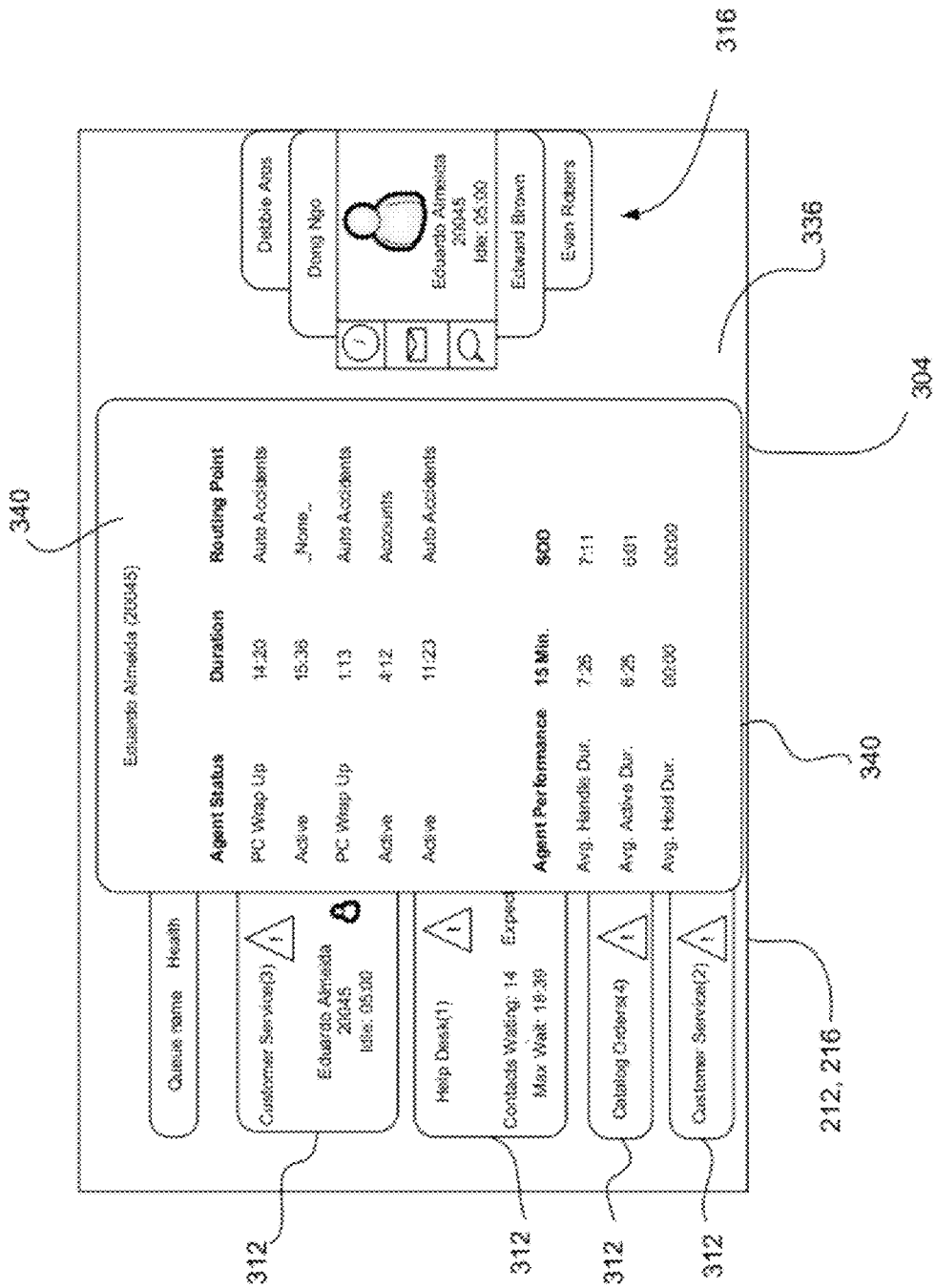

FIG. 3D depicts a screen 336 displaying detailed information 340 regarding a selected agent 122. The detailed information can include statistics regarding the agent's activity and the types of contacts handled by the agent 122.

The user interface 304, in addition to allowing a supervisor 126 to manipulate the operation of the ACD control system application 216 and in particular the assignments of agents 122 to queues 132 through the manipulation of qualifications or other selectable parameters affecting the assignment of agents 122 to queues 132, or the direct manipulation of agents 122 and queue assignments 132, supports communications with agents 122 or other personnel. For example, a supervisor 126 may choose to address a situation concerning the health of a queue 132 or otherwise that has been indicated through the information displayed by the user interface 304, using an email or other communication with the agent 122 or other individual. For example, the monitor and control application 220 can be used to launch a communication application 224 to send text based messages (such as an email message or instant message), or phone call, to a particular agent workstation 120. Such communications can be sent separately from exchanges of commands and data between the ACD server 116 and the supervisor mobile device 124. Moreover, such communications can be sent over a pipeline or channel that is different than the pipeline or channel used to transmit queue 132 information and control signals.

Figure 4:
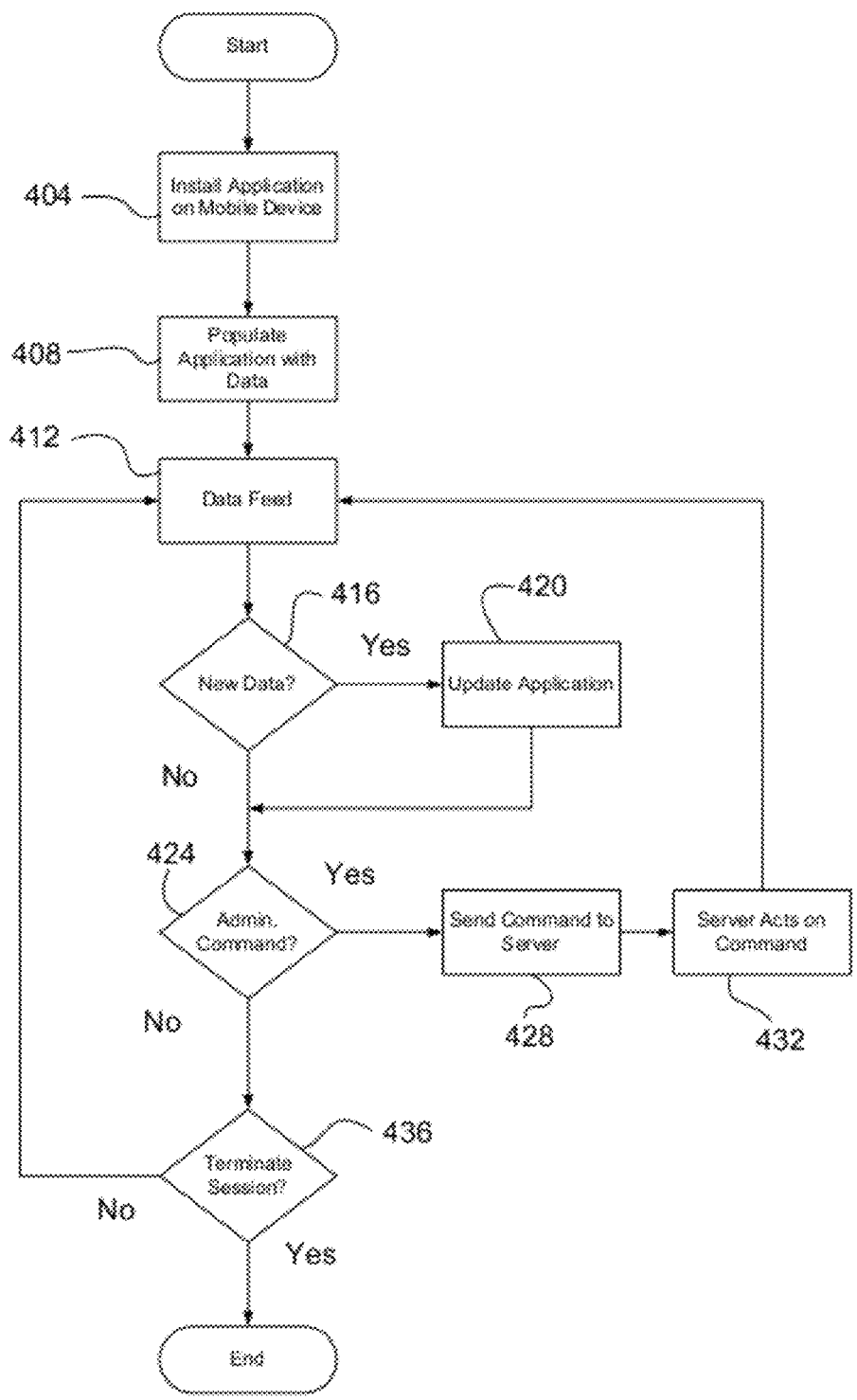
FIG. 4 is a flowchart depicting aspects of a method in accordance with embodiments of the present invention.

With reference now to FIG. 4, aspects of a method for providing remote monitoring and control of an ACD system 104 in accordance with embodiments of the present invention are illustrated. Initially, at step 404, the monitor and control application 220 is installed on the supervisor mobile device 124. At step 408, in a first storage operation, the monitor and control application 220 is populated with information or data of a first type that is particular to the call center or call center system 104 that will be monitored, but that changes relatively infrequently. Such information can include biographic information regarding the call center agents 122, contact information for such agents 122, photographs of the agents 122, and the like. Populating the monitoring and control application 220 with relatively static data can be performed when the monitoring control application 220 is installed or after the monitoring control application 220 is installed but before the application 220 is provided with a live data feed from the ACD server 116 and before the monitoring and control application 220 is operated to display queue 132 information to the supervisor or other user. At this point, the supervisor mobile device 124 has much of the information required to facilitate monitoring and control of the ACD system 104 by the supervisor 126. For example, the templates for displaying ACD system 104 information, and detailed information regarding agents 122 will be stored on the supervisor mobile device 124.

At step 412, a live (real time) connection between the ACD server 116 and the supervisor mobile device 124 is established, if one is not already in place, in a second storage operation. This establishes a data feed, whereby information or data of a second type related to the ACD system 104 is provided to the supervisor mobile device 124. The data provided as part of the feed can operate to complete data fields provided by available user interface 304 templates, and/or to provide updated or current ACD system 104 queue 132 information. Accordingly, at step 416, a determination may be made as to whether new data has been received. If new data has been received, the monitor and control application 220 is updated, and the updated information is displayed (step 420).

After updating the application 124, or after determining that no new data is available, a determination can be made as to whether a command has been received from the supervisor 126 (step 424). If a command has been received, the command is sent to the server 316 (step 428). In accordance with embodiments of the present invention, sending a command to a server does not require that a virtual private network or other persistent connection be in place between the ACD server 116 and the supervisor mobile device 124. Instead, the command can be pushed to the ACD server 116 on an as needed basis. At step 432, the ACD server 116 receives and acts on the command. The process can then return to step 412. For example, after a command has been entered by the supervisor 126, acknowledgement, such as a changed parameter relating to agent 122 assignments or queue 132 information will be sent by the ACD server 116 to the supervisor mobile device 124.

If at step 424 it was determined that an administration command was not received, a determination can be made as to whether the session should be terminated (step 436). If the session is to continue, the process can return to step 412. Alternatively, the session can end.

Figure 5:
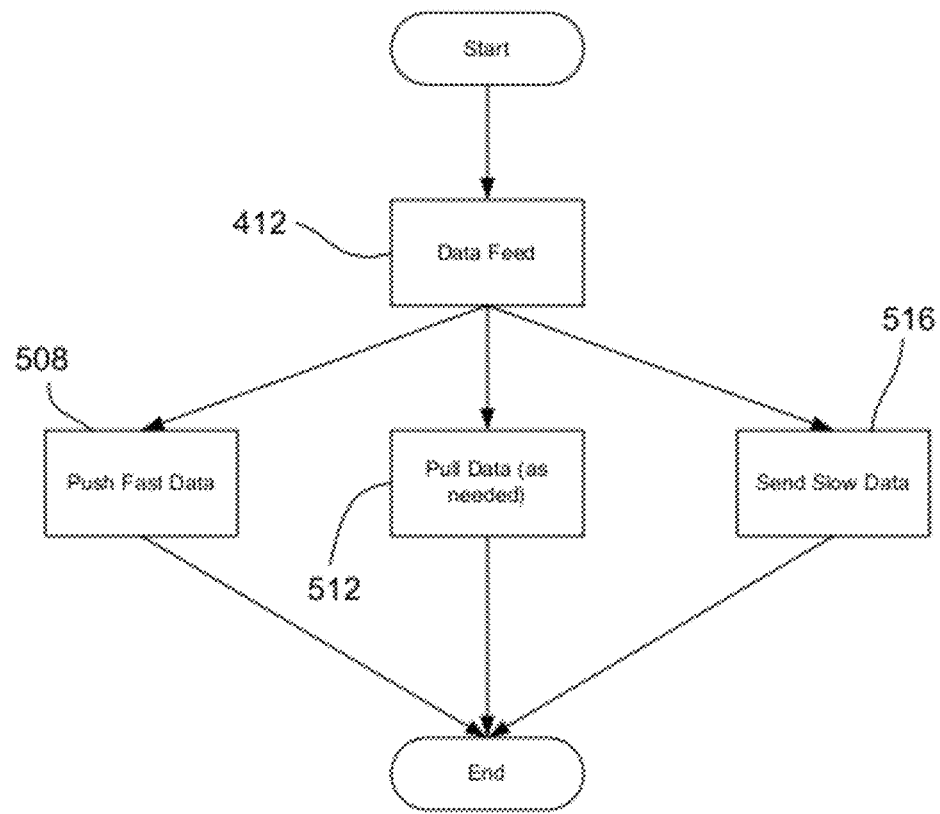
FIG. 5 is a flowchart depicting other aspects of a method in accordance with embodiments of the present invention.

With reference now to FIG. 5, aspects of data feeds in accordance with embodiments of the present invention are illustrated. In particular, upon the initiation of a data feed at step 412, different actions can be taken with respect to different types of data. For example, data that is time critical, so called "fast" data, is pushed to the supervisor mobile device 124 by the ACD server 116 (step 508). Other data can be pulled by the supervisor mobile device 124 as needed (step 512). For example, a supervisor 126 can enter a command that explicitly requests a particular item of data. As another example, a command or other action taken by the supervisor 126 can imply or be associated with a change to data that initiates a request to update the data held by the supervisor mobile device 124. Data that changes relatively infrequently ("slow" data) can be sent periodically (step 516). For example, information concerning the biographical information of individual agents 122 can be sent at predetermined time intervals at the initiation of the ACD server 116 and/or the supervisor mobile device 124.

From the foregoing description, it can be appreciated that embodiments of the present disclosure provide for the remote monitoring and control of an ACD system 104 by a supervisor 126 using a supervisor mobile device 124. In a particular exemplary embodiment, the ACD system 104 comprises an Avaya MultiVantage™ ACD system. The supervisor mobile device 124 can comprise an Apple™ iPad™ running a monitor and control application 220 comprising an app provided by Avaya Inc.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for monitoring and controlling an automatic call distribution system, comprising:
    providing a mobile device, the mobile device including a user input device and a user output device;
    presenting by the user output device of the mobile device a user interface to a user, wherein the user interface includes at least a first data template, wherein the user interface is a monitor and control application, and wherein the monitor and control application causes a processor of the mobile device to allow the user to manipulate and control the first data template associated with call distribution agents of the automatic call distribution system by assigning one of the call distribution agents to a queue;
    loading, by the processor, first call distribution system data into a memory on the mobile device, wherein at least some of the first call distribution system data is displayed in connection with the first data template;
    wherein the first call distribution system data includes biographical information concerning the call distribution agents;
    establishing, by the processor, a connection between the mobile device and an automatic call distribution system server; and
    using the connection between the mobile device and the automatic call distribution system server, obtaining, by the mobile device, second call distribution system data from the automatic call distribution system server and loading, by the processor, the second call distribution system data into the memory on the mobile device, wherein the second call distribution system data includes information regarding a current status of a queue, wherein at least some of the second call distribution system data is displayed in connection with the at least a first data template.

2. The method of claim 1, further comprising:
    receiving a selection from the user of a first item displayed as part of the first data template;
    in response to the received selection, displaying additional of at least one of the first call distribution system data and the second call distribution system data.

3. The method of claim 1, further comprising:
    receiving a selection from the user of a first item displayed as part of the first data template;
    in response to the received selection, obtaining by the mobile device third call distribution system data from the automatic call distribution system server and loading the third call distribution system data into the memory on the mobile device, wherein at least some of the third call distribution system data is displayed in connection with one of the first data template and a second data template.

4. The method of claim 3, further comprising:
    initiating a communication from the mobile device with the monitor and control application to a selected agent.

5. The method of claim 4, wherein the communication is transmitted from the mobile device with the monitor and control application to a workstation associated with the agent over a channel that is different than a channel used to transmit call distribution system data.

6. The method of claim 5, wherein the connection between the mobile device and the call distribution system server further includes a cellular data network and wherein the communication includes an email communication.

7. The method of claim 3, wherein the third call distribution system data includes data that changes slow and can be sent to the mobile device periodically.

8. The method in claim 7, wherein the third call distribution system data further includes data that facilitates monitoring and control of the automatic call distribution system and is pulled into the mobile device.

9. The method of claim 1, wherein the first call distribution system data further includes data that rarely changes and can be pre-populated onto the mobile device.

10. The method of claim 1, wherein the second call distribution system data includes data that is time critical and is pushed to the mobile device when a change occurs.

11. The method of claim 1, wherein a current status information is displayed for a plurality of queues simultaneously.

12. The method of claim 1, wherein the connection between the mobile device and the call distribution system server includes a wireless connection.

13. The method of claim 12, wherein the connection between the mobile device and the call distribution system server further includes the Internet.

14. A mobile device, comprising:
a communication interface;
a user output;
a user input;
a processor;
a memory, wherein the memory has stored thereon:
first automatic call distribution system data, wherein the first automatic call distribution system data is loaded into the memory in a first storage operation, wherein the first automatic call distribution system data includes biographical information and photographs of call distribution system agents;
second call distribution system data, wherein the second call distribution data is loaded into the memory in a second storage operation; and
a monitor and control application, wherein the monitor and control application is executed by the processor and displays call center queue information to a user wherein the user can assign one of the call distribution agents to a queue.

15. The device of claim 14, further comprising:
a communication application stored in the memory, wherein the communication application supports text communications.

16. The device of claim 14, wherein the mobile device is provided as a tablet computer, and wherein at least a first user output and an first user input are provided as a touch screen display.

17. An automatic call distribution system server comprising:
a processor;
a communication interface to interconnect the processor with one or more networks; and
a memory, coupled with the processor, comprising instructions that program the processor to:
establish, by the communication interface, a connection with a mobile device of a user, wherein the connection with the mobile device traverses the one or more networks;
provide, by the communication interface, to the mobile device a first data template, wherein the first data template is associated with call distribution agents of the automatic call distribution system;
provide, by the communication interface, to the mobile device first call distribution system data, wherein at least some of the first call distribution system data is to be displayed by the mobile device in connection with the first data template and wherein the first call distribution system data includes biographical information concerning one or more of the call distribution agents;
provide, by the communication interface and over the connection, to the mobile device second call distribution system data, wherein the second call distribution system data includes information regarding a current status of a queue and wherein at least some of the second call distribution system data is to be displayed by the mobile device in connection with the first data template; and
receive, by the communication interface, from the mobile device a command of the user to assign one of the call distribution agents to the queue.

18. The server of claim 17, wherein the processor further receives, by the communication interface and over the connection, a selection from the mobile device of a first item displayed as part of the first data template and, in response to the received selection, provides, by the communication interface and over the connection, to the mobile device third call distribution system data, wherein at least some of the third call distribution system data is to be displayed by the mobile device in connection with one of the first data template and a second data template.

19. The server of claim 17, wherein each of the data of a first type, data of a second type, and text communications use a different communication channel, wherein the supervisor mobile device includes a tablet computer, and wherein the connection includes a connection over a cellular data network or wireless network.

20. The server of claim 17, wherein the automatic call distribution system receives an incoming communication from the mobile device directed to a workstation associated with a selected agent and wherein the incoming communication is over a channel that is different than a channel used to transmit call distribution system data.

* * * * *